(12) United States Patent
Funase et al.

(10) Patent No.: US 11,865,871 B2
(45) Date of Patent: Jan. 9, 2024

(54) TIRE

(71) Applicant: Sumitomo Rubber Industries, Ltd., Kobe (JP)

(72) Inventors: Natsumi Funase, Kobe (JP); Kozo Yoshimura, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 3 days.

(21) Appl. No.: 17/460,766

(22) Filed: Aug. 30, 2021

(65) Prior Publication Data
US 2022/0063345 A1 Mar. 3, 2022

(30) Foreign Application Priority Data
Aug. 31, 2020 (JP) .................................. 2020-145944

(51) Int. Cl.
*B60C 11/13* (2006.01)
*B60C 11/12* (2006.01)

(52) U.S. Cl.
CPC ........ *B60C 11/1353* (2013.01); *B60C 11/125* (2013.01); *B60C 11/1259* (2013.01); *B60C 2011/1361* (2013.01)

(58) Field of Classification Search
CPC ............. B60C 11/0332; B60C 11/1353; B60C 11/125; B60C 11/1259; B60C 2011/1361; B60C 11/04

See application file for complete search history.

(56) References Cited

U.S. PATENT DOCUMENTS

| | | | |
|---|---|---|---|
| 9,211,768 B2 | 12/2015 | Inoue | |
| 2004/0211501 A1* | 10/2004 | Kajita | ................... B60C 11/005 |
| | | | 152/209.15 |
| 2010/0252159 A1* | 10/2010 | Mukai | ................. B60C 11/0302 |
| | | | 152/209.25 |
| 2013/0112325 A1* | 5/2013 | Mukai | ................... B60C 11/125 |
| | | | 152/209.8 |
| 2014/0283967 A1 | 9/2014 | Inoue | |

(Continued)

FOREIGN PATENT DOCUMENTS

| | | | |
|---|---|---|---|
| JP | 2006082586 A | * | 3/2006 |
| JP | 2011143891 A | * | 7/2011 |

(Continued)

OTHER PUBLICATIONS

Himuro, English Machine Translation of JP 2006082586, 2006 (Year: 2006).*

(Continued)

*Primary Examiner* — Justin R Fischer
*Assistant Examiner* — Brendon Charles Darby
(74) *Attorney, Agent, or Firm* — Birch, Stewart, Kolasch & Birch, LLP (57) ABSTRACT

A tire has a tread portion provided with three or four circumferential grooves including a shoulder circumferential groove to form a shoulder land region and a middle land region. The middle land region is provided with a middle circumferential sipe and middle lateral sipes. The shoulder land region is provided with shoulder lateral grooves extending from the shoulder circumferential groove to a tread edge, and shoulder lateral sipes extending from the shoulder circumferential groove and terminated without reaching the tread edge.

18 Claims, 8 Drawing Sheets

(56) References Cited

U.S. PATENT DOCUMENTS

| | | | |
|---|---|---|---|
| 2014/0305559 A1* | 10/2014 | Takemoto | B60C 11/12 |
| | | | 152/209.8 |
| 2016/0318352 A1* | 11/2016 | Hibino | B60C 11/0306 |
| 2017/0368882 A1* | 12/2017 | Mukai | B60C 11/0302 |
| 2018/0086147 A1 | 3/2018 | Morii | |
| 2018/0297413 A1 | 10/2018 | Nakamichi | |
| 2018/0370290 A1 | 12/2018 | Hirosue et al. | |
| 2019/0193475 A1* | 6/2019 | Shiraishi | B60C 11/0302 |
| 2020/0001656 A1* | 1/2020 | Limroth | B60C 11/04 |

FOREIGN PATENT DOCUMENTS

| | | | |
|---|---|---|---|
| JP | 2014-184828 A | | 10/2014 |
| JP | 2016040156 A | * | 3/2016 |
| WO | WO 2015/170478 A1 | | 11/2015 |
| WO | WO 2019/117145 A1 | | 6/2019 |

OTHER PUBLICATIONS

Takahashi, English Machine Translation of JP 2011143891, 2011 (Year: 2011).*

Inoue, English Machine Translation of JP 2016040156, 2016 (Year: 2016).*

Extended European Search Report for European Application No. 21191064.1, dated Dec. 14, 2021.

* cited by examiner

TIRE

TECHNICAL FIELD

The present disclosure relates to a tire, more particularly to a tread pattern.

BACKGROUND ART

Patent Document 1 below discloses a pneumatic tire in which an inboard middle land region and an outboard middle land region are provided with only sipes, and the sipes are specifically configured to improve the steering stability and ride comfort of the pneumatic tire in a well-balanced manner.
Patent Document 1: Japanese Patent Application Publication No. 2014-184828

SUMMARY OF THE DISCLOSURE

Problems to be Solved by the Disclosure

In recent years, electric vehicles and hybrid vehicles have become widespread.
Since these vehicles are equipped with heavy batteries, the weight of these vehicles tends to increase. This tendency is particularly remarkable in large sized vehicles such as SUVs. In general, the cornering power generated by tires has a positive correlation with the tire loads.
Therefore, when the pneumatic tire of Patent Document 1 is mounted on such a heavy vehicle, the cornering power or cornering force is increased more than necessary. As a result, there is a tendency that the steering stability of the vehicle, especially the steering linearity and the behavior when reaching near the side-slip limit are impaired.
On the other hand, in order to suppress the cornering power of the tire, if grooves disposed in the tread portion is increased in number, the noise during running tends to increase.
In view of the above circumstances, the present disclosure has been devised, and
a primary objective of the present disclosure is to provide a tire having improved steering stability and noise performance.

Means for Solving the Problems

According to the present disclosure, a tire comprises:
a tread portion having a first tread edge and a second tread edge, and provided with three or four circumferential grooves continuously extending in the tire circumferential direction to axially divide the tread portion into a plurality of land regions, wherein
the plurality of land regions include
a shoulder land region including the first tread edge, and
a middle land region adjacent to the shoulder land region,
the circumferential grooves include
a shoulder circumferential groove between the shoulder land region and the middle land region,
the middle land region is provided with
a middle circumferential sipe extending continuously in the tire circumferential direction, and
a plurality of middle lateral sipes extending across the entire axial width of the middle land region,
the shoulder land region is provided with a plurality of shoulder lateral grooves extending from the shoulder circumferential groove to the first tread edge, and a plurality of shoulder lateral sipes extending from the shoulder circumferential groove and terminated within the shoulder land region without reaching the first tread edge.

Effects of the Invention

In the tire according to the present disclosure, therefore, as the tread portion is configured as described above, the steering stability and noise performance can be improved.

DETAILED DESCRIPTION OF THE DISCLOSURE

Figure 1:
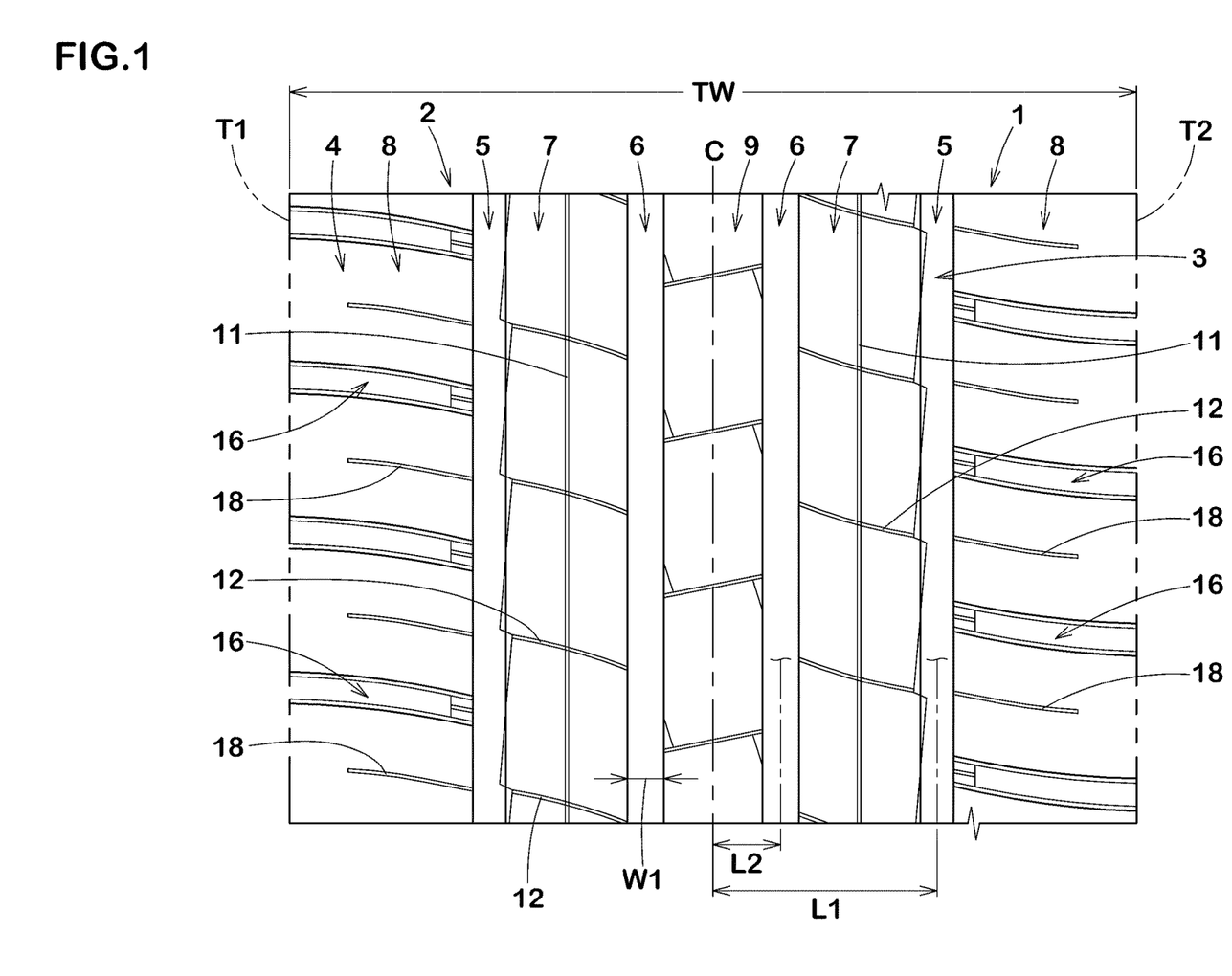
FIG. 1 is a developed partial view of a tread portion of a tire according to an embodiment of the present disclosure.

The present disclosure can be applied to a pneumatic tire as well as a non-pneumatic tire so called airless tire, for various vehicles, for example, passenger cars, SUVs, heavy duty vehicles such as truck and bus and the like, but suitably applied to a pneumatic tire for passenger cars.
Taking a pneumatic tire for passenger cars, particularly SUVs as an example, an embodiment of the present disclosure will be described with reference to the drawings.
FIG. 1 is a developed partial view of a tread portion 2 of a tire 1 as an embodiment of the present disclosure.
The tread portion 2 has a first tread edge T1 and a second tread edge T2, and is provided with three or four circumferential grooves 3 extending continuously in the tire circumferential direction to axially divide the tread portion 2 into a plurality of land regions 4.
In the present embodiment, four circumferential grooves 3 are provided, and the tread portion 2 is axially divided into five land regions 4.
As another embodiment, three circumferential grooves 3 can be provided to divide the tread portion 2 into four land regions 4.
The tread edges T1 and T2 means the axial outermost edges of the ground contacting patch of the tire which occurs when the tire under a standard state is put on a flat horizontal surface at a camber angle of zero and loaded with a standard tire load.
The "standard state" of a tire is as follows.
In the case of a pneumatic tire, the "standard state" is such that the tire is mounted on a standard rim, and inflated to a standard pressure, but loaded with no tire load.

In the case of a non-pneumatic tire, the "standard state" is such that the tire is ready to attach to a vehicle axis but not attached, and loaded with no tire load. Namely, if the non-pneumatic tire needs to be mounted on a wheel rim or any equivalent device, the "standard state" is such that the tire is mounted on such a wheel rim or equivalent device, but loaded with no tire load.

The above-mentioned standard rim, in particular that for a pneumatic tire, is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and a standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load capacity" in ETRTO, the maximum value given in the above-mentioned table in TRA or the like.

If there is no applicable standards for the pneumatic tire, or not yet established, the standard rim, the standard pressure and the standard tire load mean a design rim, a maximum pressure and s maximum tire load specified for the tire by the tire manufacturer or the like.

In the case of a non-pneumatic tire for which applicable standards have not yet established, the standard tire load means a maximum tire load specified by the tire manufacturer or the like. If the non-pneumatic tire needs to be mounted on a wheel rim or any equivalent device, the standard rim means a design rim or equivalent specified by the tire manufacturer or the like.

The tread width TW is the width measured under the standard state, as the axial distance between the tread edges determined as above.

In this application including specification and claims, various dimensions, positions and the like of the tire refer to those under the standard state of the tire unless otherwise noted.

In the present embodiment, the circumferential grooves 3 are two axially outermost shoulder circumferential grooves 5 and two axially inner crown circumferential grooves 6.

The two crown circumferential grooves 6 are disposed one on each side of the tire equator C.

The two shoulder circumferential grooves 5 are respectively disposed axially outside the two crown circumferential grooves 6. In this embodiment, the circumferential grooves 3 are arranged line-symmetrically with respect to the tire equator C.

It is preferable that the distance L1 in the tire axial direction from the tire equator C to the groove center line of each of shoulder circumferential groove 5 is set in a range from 20% to 35% of the tread width TW.

It is preferable that the distance L2 in the tire axial direction from the tire equatorial line C to the groove center line of each of the crown circumferential grooves 6 is set in a range from 5% to 15% of the tread width TW.

In the present embodiment, each of the circumferential grooves 3 is a straight groove extending parallel to the tire circumferential direction.

As another embodiment, the circumferential grooves 3 may extend in a wavy shape or zigzag shape.

It is preferable that the groove width W1 of each of the circumferential grooves 3 is set in a range from 2.0% to 6.0% of the tread width TW.

It is preferable that the depth of each of the circumferential grooves 3 is in a range from 5 to 10 mm when the tire 1 is a pneumatic tire for a passenger car.

The land regions 4 include
a shoulder land region 8 extending axially inwardly from the first tread edge T1, and
a middle land region 7 adjacent to the shoulder land region 8. similarly, the land regions 4 in the present embodiment include
a second shoulder land region 8 extending axially inwardly from the second tread edge T2, and
a second middle land region 7 adjacent to the second shoulder land region 8.

The following descriptions will be made of the shoulder land region 8 and the middle land region 7 on the first tread edge T1 side, but the descriptions can be applied to the second shoulder land region 8 and the second middle land region 7 on the second tread edge T2 side.

Figure 2:
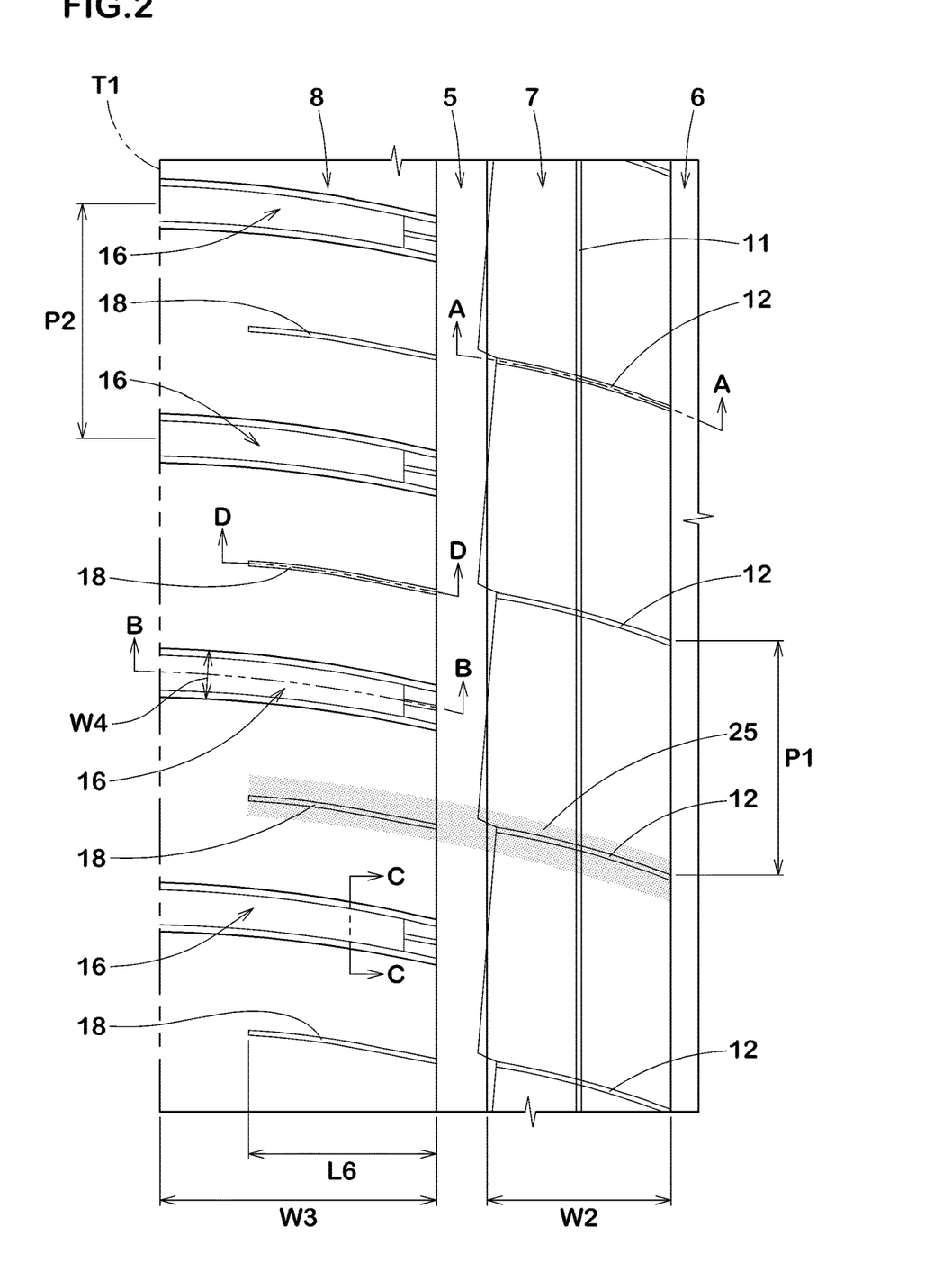
FIG. 2 shows partial top views of a middle land region and a shoulder land region of FIG. 1.

As shown in FIG. 2, the middle land region 7 is provided with a middle circumferential sipe 11 extending continuously in the tire circumferential direction, and a plurality of middle lateral sipes 12 extending across the entire axial width of the middle land region 7, intersecting the middle circumferential sipe 11.

The shoulder land region 8 is provided with a plurality of shoulder lateral grooves 16 extending from the adjacent shoulder circumferential groove 5 to the first tread edge T1 at least, and a plurality of shoulder lateral sipes 18 extending from the shoulder circumferential groove 5 and terminated within the shoulder land region 8 without reaching the first tread edge T1.

The term "sipe" means a narrow groove having a width not more than 1.5 mm inclusive of a cut having no substantial groove width.

It is preferable for such a sipe to have a width in a range from 0.2 to 1.2 mm, more preferably 0.5 to 1.0 mm.

In the sipes provided in the present embodiment, the width of each sipe is not more than 1.5 mm over the entire depth. However, the sipe may have a width of more than 1.5 mm at the opening or the like.

In this application, when a groove has, in its depth direction, a portion having a width of not more than 1.5 mm and a portion having a width of more than 1.5 mm,
if such a portion having a width of not more than 1.5 mm is more than 50% of the total depth, then the groove is treated as a sipe with a groove portion.

If such a portion having a width of more than 1.5 mm is more than 50% of the total depth, then the groove is treated as a groove with a sipe portion.

In the present disclosure, since the above described configurations are adopted, the steering stability and noise performance are improved for the following reasons.

The middle circumferential sipe 11 and the middle lateral sipes 12 can relax the rigidity of the middle land region 7 and can appropriately reduce the cornering force. Thereby, the steering linearity is improved, and as a result, the steering stability is improved.

In addition, these sipes generate almost no pumping noise sound when entering into the ground contacting patch, which improves the noise performance.

Further, the shoulder lateral grooves 16 can reduce the rigidity of the shoulder land region 8 and decrease the ground contact area of the shoulder land region 8, so the cornering force generated by the shoulder land region 8 can be reduced. As a result, the behavior when reaching near the side-slip limit becomes stable, and excellent steering stability can be exhibited.

On the other hand, since the shoulder land region 8 of the present disclosure is provided with the shoulder lateral sipes 18 extending from the shoulder circumferential groove 5, the vicinity of the axially inner end of each shoulder lateral sipe 18 is easily closed, which can effectively prevent the generation of the pumping sound, and also can suppress resonance excited by pattern noise from the middle land region 7 and shoulder land region 8.

As described above, in the present disclosure, by reducing the rigidity of the middle land region 7 and shoulder land region 8 in different manners, it is possible to obtain both the effect of improving the steering linearity and the effect of stabilizing the behavior when reaching near the side-slip limit, therefore, the steering stability can be significantly improved.

Further, with the above configuration, the frequency band of noise sound generated when the middle land region 7 and the shoulder land region 8 come into contact with the ground, is dispersed, and the noise performance can be improved. According to the present disclosure, the steering stability and the noise performance can be improved in this way.

Hereinafter, preferable more detailed features of the present embodiment will be described. such features can be adopted alone or in any combination in order to enjoy the benefits described.

The middle circumferential sipe 11 in this example extends linearly in parallel with the tire circumferential direction. However, the middle circumferential sipe 11 may extend in a wavy shape, for example.

The middle circumferential sipe 11 in this example is disposed in a central region when the ground contacting top surface of the middle land region 7 is divided into three equal regions in the tire axial direction.

The distance in the tire axial direction from the center in the tire axial direction of the middle land region 7 to the middle circumferential sipe 11 is 15% or less, preferably 10% or less, more preferably 5% or less of the width w2 in the tire axial direction of the ground contacting top surface of the middle land region 7.

Such middle circumferential sipes 11 can exert the above-mentioned effect while suppressing uneven wear of the middle land regions 7.

The pitch lengths P1 in the tire circumferential direction of the middle lateral sipes 12 are larger than the width w2 in the tire axial direction of the ground contacting top surface of the middle land regions 7.

Specifically, the pitch lengths P1 are in a range from 120% to 140% of the width w2.

Such middle lateral sipes 12 help to improve wet performance and the steering stability in a well-balanced manner.

Here, pitch lengths of sipes or grooves means the circumferential distances between corresponding positions (for example, widthwise centers, edges or the like) of the respective sipes or grooves measured at the same axial position.

In the present embodiment, the middle lateral sipes 12 have a depth of from 2.0 to 4.0 mm, for example.

The middle lateral sipe 12 may have a constant depth along the longitudinal direction thereof.

The middle lateral sipes 12 are inclined in a first direction with respect to the tire axial direction (the inclination is downward to the right in each drawing).

The maximum angle of each middle lateral sipe 12 with respect to the tire axial direction is set in a range from 18 to 25 degrees, for example.

In this embodiment, the middle lateral sipes 12 are smoothly curved.

Such middle lateral sipes 12 can provide a frictional force in the tire circumferential direction as well as a frictional force in the tire axial direction.

Figure 3:
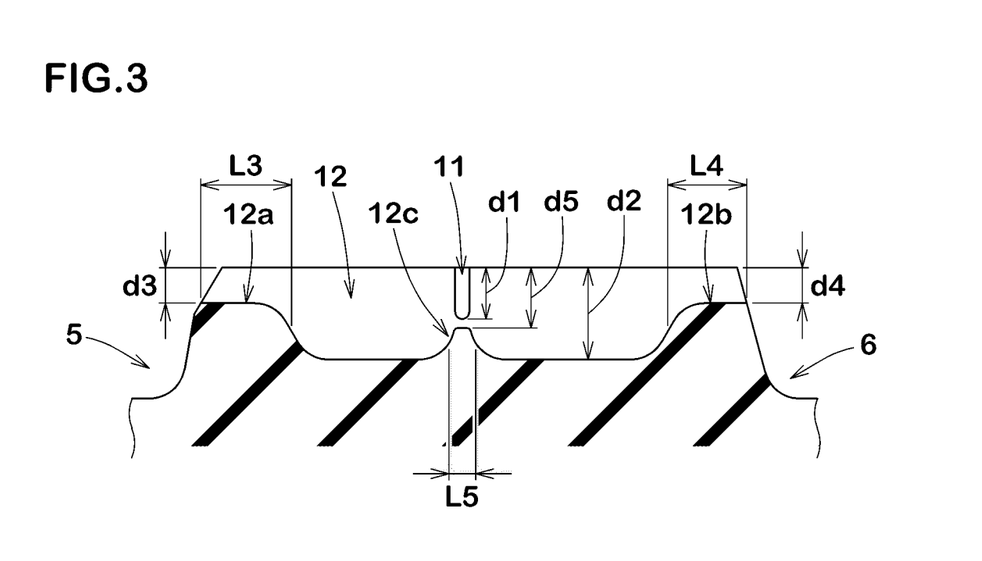
FIG. 3 is a cross-sectional view taken along line A-A of FIG. 2.

FIG. 3 is a cross-sectional view taken along line A-A of FIG. 2. As shown, the middle lateral sipe 12 in this embodiment has a variable depth, and the maximum depth d2 of the middle lateral sipe 12 is preferably larger than the depth d1 of the middle circumferential sipe 11. For example, the maximum depth d2 of the middle lateral sipe 12 is in a range from 60% to 80% of the depth of the shoulder circumferential groove 5.

Such middle lateral sipes 12 can improve the steering stability and the noise performance in a well-balanced manner.

The middle lateral sipe 12 comprises a shallow portion with a raised bottom.

The shallow portion in this example includes: a first shallow portion 12a provided at an end on the first tread edge T1 side; a second shallow portion 12b provided at an end on the tire equator C side; and a third shallow portion 12c provided between the first shallow portion 12a and the second shallow portion 12b.

The middle lateral sipe 12 having such shallow portions can suppress an excessive decrease in the rigidity of the middle land region 7.

The depth d3 of the first shallow portion 12a and the depth d4 of the second shallow portion 12b are set in a range from 30% to 45% of the maximum depth d2 of the middle lateral sipe 12, for example.

The length L3 in the tire axial direction of the first shallow portion 12a and the length L4 in the tire axial direction of the second shallow portion 12b are set in a range from 10% to 25% of the width w2 in the tire axial direction of the ground contacting top surface of the middle land region 7, for example, The middle lateral sipes 12 having such first shallow portion 12a and second shallow portion 12b improve the steering stability and the noise performance in a well-balanced manner. Here, the length in the tire axial direction of the shallow portion or the like is measured at half the height of the shallow portion or the like.

The depth d5 of the third shallow portion 12c is preferably larger than the depths of the first shallow portion 12a and the second shallow portion 12b.

The depth d5 of the third shallow portion 12c is set in a range from 55% to 75% of the maximum depth d2 of the middle lateral sipe 12.

Further, the length L5 in the tire axial direction of the third shallow portion 12c is preferably smaller than the lengths of the first shallow portion 12a and the second shallow portion 12b. The length L5 of the third shallow portion 12c is in a range from 3% to 15% of the width w2 in the tire axial direction of the ground contacting top surface of the middle land regions 7. Such third shallow portion 12c allows the central portion of the middle lateral sipe 12 to appropriately easily open to improve the wet performance while suppressing uneven wear of the middle land region 7.

In the present embodiment, the middle circumferential sipe 11 intersects the third shallow portions 12c of the middle lateral sipes 12. The depth of the middle circumferential sipe 11 is smaller than the depth of the third shallow portions 12c. Thereby, uneven wear of the middle land region 7 is suppressed.

As shown in FIG. 2, the shoulder lateral grooves 16 and the shoulder lateral sipes 18 are alternately arranged in the tire circumferential direction.

The pitch lengths P2 in the tire circumferential direction of the shoulder lateral grooves 16 are smaller than the width w3 in the tire axial direction of the ground contacting top surface of the shoulder land region 8, for example.

Specifically, the pitch lengths P2 are in a range from 80% to 95% of the width w3.

In the present embodiment, the pitch lengths P2 of the shoulder lateral grooves 16 are substantially the same as the pitch lengths P1 of the middle lateral sipes 12.

Further, the pitch lengths in the tire circumferential direction of the shoulder lateral sipes 18 are substantially the same as the pitch lengths P2 in the tire circumferential direction of the shoulder lateral grooves 16.

The shoulder lateral grooves 16 are inclined in the above-mentioned first direction with respect to the tire axial direction, for example.

The maximum angle of the shoulder lateral groove 16 with respect to the tire axial direction is, for example, 5 to 15 degrees.

It is preferable that the shoulder lateral grooves 16 has a constant groove width w4 from the shoulder circumferential groove 5 to the first tread edge T1.

The groove width w4 is, for example, in a range from 70% to 100% of the groove width w1 of the circumferential grooves 3.

Such shoulder lateral grooves 16 improve the wet performance and the steering stability in a well-balanced manner.

Figure 4:
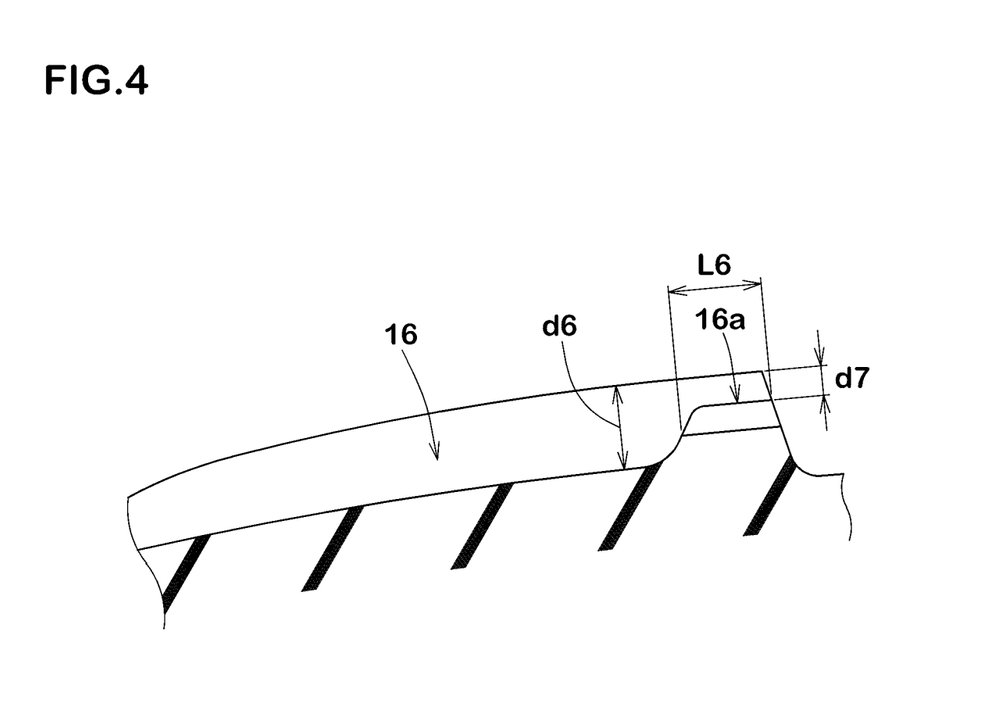
FIG. 4 is a cross-sectional view taken along line B-B of FIG. 2.

FIG. 4 is a cross-sectional view taken along line B-B of FIG. 2.

As shown, the groove bottom of the shoulder lateral groove 16 is locally raised to have a raised portion 16a. The groove bottom raised portion 16a connects between blocks formed on both sides in the tire circumferential direction of the shoulder lateral groove 16.

Such groove bottom raised portion 16a reduces the pumping sound generated from the shoulder lateral groove 16.

The groove bottom raised portion 16a is formed at the axially inner end of the shoulder lateral groove 16.

The length L6 in the tire axial direction of the groove bottom raised portion 16a is, for example, set in a range from 5% to 15% of the width w3 in the tire axial direction of the shoulder land region 8.

Such groove bottom raised portion 16a improves the steering stability and the noise performance in a well-balanced manner.

The depth d7 of the groove bottom raised portion 16a is, for example, in a range from 30% to 50% of the maximum depth d6 of the shoulder lateral groove 16.

In the present embodiment, the depth d7 of the groove bottom raised portion 16a is
in a range from 80% to 120% of the depth of the first shallow portion 12a, and
in a range from 80% to 120% of the depth of the second shallow portion 12b of the middle lateral sipe 12.

In addition to the above-mentioned effects, such groove bottom raised portions 16a can suppress uneven wear of the middle land regions 7 and the shoulder land regions 8.

Figure 5:
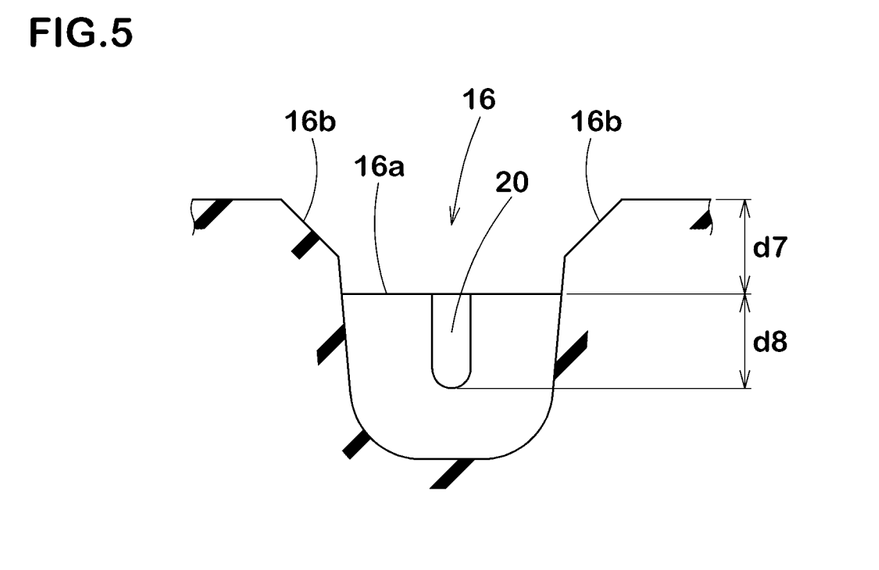
FIG. 5 is a cross-sectional view taken along line c-c of FIG. 2.

FIG. 5 is a cross-sectional view taken along line C-C of FIG. 2.

As shown, the groove bottom raised portion 16a is provided with a groove bottom sipe 20 which is open in the outer surface thereof and extends along the longitudinal direction of the shoulder lateral groove 16.

Such groove bottom raised portion 16a can reduce the rigidity of the shoulder land regions 8 to improve the steering stability while suppressing the pumping noise sound of the shoulder lateral groove 16.

The depth d8 of the groove bottom sipe 20 from the outer surface of the groove bottom raised portion 16a is set in a range from 80% to 120% of the depth d7 of the groove bottom raised portion 16a (namely, the depth from the ground contacting top surface of the shoulder land region 8 to the outer surface of the groove bottom raised portion 16a).

Preferably, the depth d8 of the groove bottom sipe 20 is greater than the maximum depth of the middle circumferential sipe 11, and
greater than the depth of the first shallow portion 12a of the middle lateral sipe 12, and
greater than the depth of the second shallow portion 12b of the middle lateral sipe 12.

Such groove bottom sipe 20 can surely exert the above-mentioned effects.

As shown in FIG. 5, in the cross section of the shoulder lateral groove 16 perpendicular to the longitudinal direction thereof, each corner of the shoulder lateral groove 16 is preferably provided with a chamfer 16b inclined at an angle of from 30 to 60 degrees with respect to the normal direction to the tread.

Such chamfer 16b can reduce the impact sound when the edges of the shoulder lateral groove 16 contact with the road surface. Further, such chamfer 16b serves to suppress a cornering force caused by ply steer to prevent a vehicle drifting to one side.

As shown in FIG. 2, the shoulder lateral sipes 18 are inclined in the first direction with respect to the tire axial direction.

The angle of the shoulder lateral sipe 18 with respect to the tire axial direction is, for example, set in a range from 5 to 15 degrees.

Preferably, the angle difference between the shoulder lateral sipe 18 and the shoulder lateral groove 16 is 5 degrees or less. In the present embodiment, the shoulder lateral sipes 18 are parallel with the shoulder lateral grooves 16.

Such shoulder lateral sipes 18 help to suppress uneven wear of the shoulder land regions 8.

The shoulder lateral sipe 18 extends at least 40% or more of the width w3 in the tire axial direction of the ground contacting top surface of the shoulder land region 8.

In the present embodiment, the shoulder lateral sipe 18 crosses the center in the tire axial direction of the ground contacting top surface of the shoulder land region 8.

Thereby, the ground contact area of the shoulder land regions 8 is be appropriately reduced, and the steering stability can be improved.

The length L6 in the tire axial direction of the shoulder lateral sipe 18 is larger than the width w2 in the tire axial direction of the ground contacting top surface of the middle land region 7.

The length L6 of the shoulder lateral sipe 18 is, for example, set in a range from 60% to 75% of the width w3 in the tire axial direction of the ground contacting top surface of the shoulder land region 8.

Such shoulder lateral sipe 18 can turn into white noise the impact sound generated when the shoulder land region 8 and the middle land region 7 contact with the road surface, while exerting the above-mentioned effects.

It is preferable that the distance in the tire circumferential direction between each of the shoulder lateral sipes 18 and the nearest one of the middle lateral sipes 12 is small.

Specifically, one middle lateral sipe 12 and one shoulder lateral sipe 18 extend in a zone 25 extending with a relatively small width (for easy understanding, one of the zones is shaded with fine dots in FIG. 2).

The width of such zone 25 is, for example, 8.0 mm or less, preferably 5.0 mm or less, and more preferably 3.0 mm or less. Thereby, the middle lateral sipe 12 and the shoulder lateral sipe 18 cooperate to provide a large frictional force in the tire circumferential direction, and the wet performance is improved.

Figure 6:
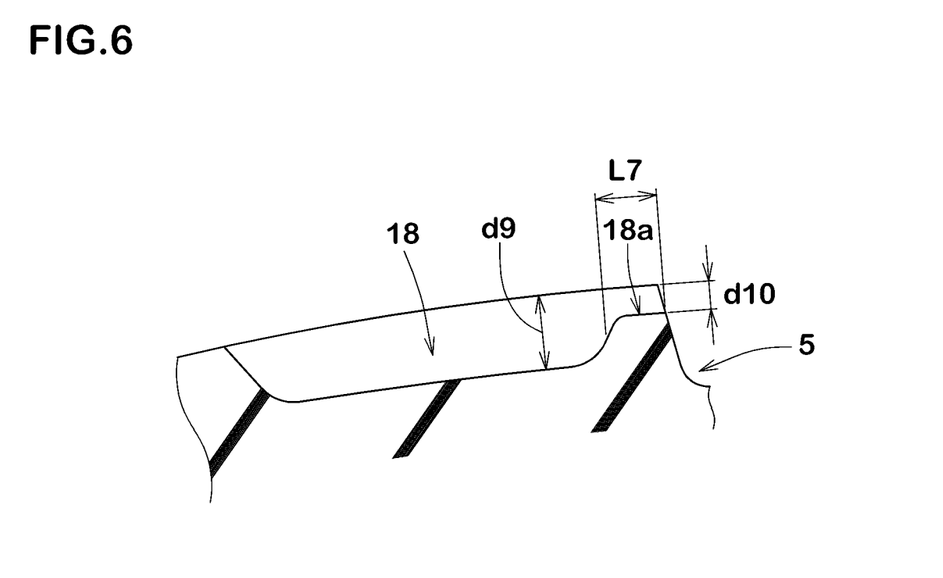
FIG. 6 is a cross-sectional view taken along line D-D of FIG. 2.

FIG. 6 is a cross-sectional view taken along line D-D of FIG. 2.

As shown, the maximum depth d9 of the shoulder lateral sipe 18 is set in a range from 55% to 70% of the depth of the shoulder circumferential groove 5, for example.

In the present embodiment, the maximum depth of the middle circumferential sipe 11 is smaller than the maximum depth d9 of the shoulder horizontal sipe 18.

Thereby, the impact sound when the middle land region 7 contacts with the road surface and the impact sound when the shoulder land regions 8 contacts with the road surface become white noise, and the noise performance is improved.

As shown in FIG. 6, the bottom of the shoulder lateral sipe 18 is partially raised at the axially inner end so that the shoulder lateral sipe 18 has an axially inner shallow portion 18a.

The depth d10 of the axially inner shallow portion 18a is set in a range from 35% to 50% of the maximum depth d9 of the shoulder lateral sipe 18.

The length L7 in the tire axial direction of the axially inner shallow portion 18a is set in a range from 5% to 20% of the length L6 in the tire axial direction of the shoulder lateral sipe 18.

Figure 7:
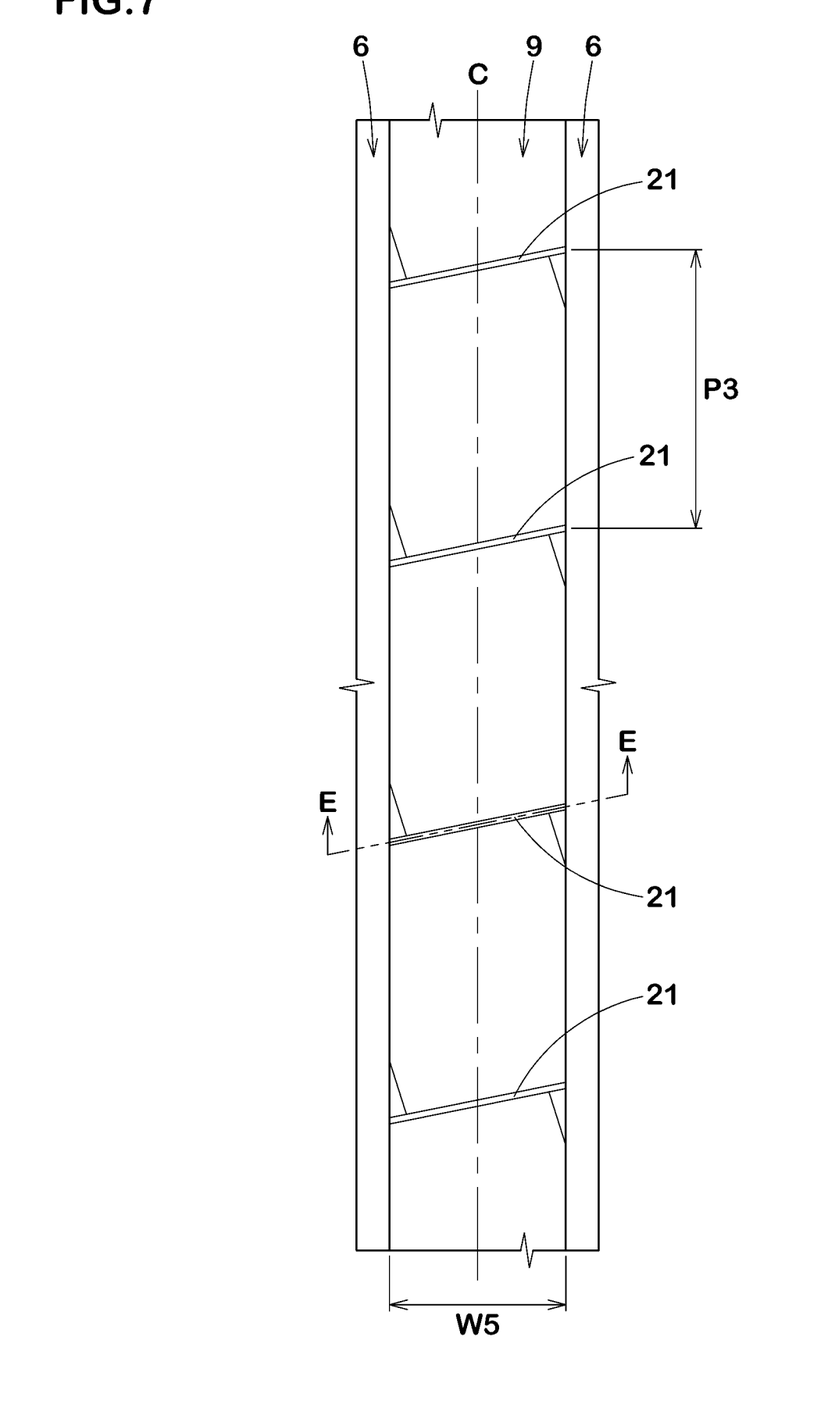
FIG. 7 is a partial top view of a crown land region of FIG. 1.

FIG. 7 is a partial top view of the crown land region 9. As shown, the crown land region 9 is provided with a plurality of crown lateral sipes 21 extending across the entire axial width of the crown land region 9.

The pitch lengths P3 in the tire circumferential direction of the crown lateral sipes 21 are larger than the width w5 in the tire axial direction of the ground contacting top surface of the crown land region 9, for example.

Specifically, the pitch lengths P3 are set in a range from 1.40 to 1.80 times the width w5.

Preferably, the pitch lengths P3 of the crown lateral sipes 21 are in a range from 80% to 120% of the pitch lengths P1 of the middle lateral sipes 12.

More preferably, the pitch lengths P3 and the pitch lengths P1 have the same value.

As shown in FIG. 1, in the tire circumferential direction, circumferential extents of the respective crown lateral sipes 21 do not overlap with circumferential extents of the respective middle lateral sipes 12.

Such arrangement of the crown lateral sipes 21 helps to suppress uneven wear of the respective land regions.

As shown in FIG. 7, the crown lateral sipes 21 are inclined in a second direction (opposite to the first direction) with respect to the tire axial direction (the inclination is upward to the right in each drawing).

The angles of the crown lateral sipes 21 with respect to the tire axial direction are, for example, 5 to 15 degrees.

Thereby, the tire conicity is reduced, and a vehicle drifting to one side can be suppressed.

Figure 8:
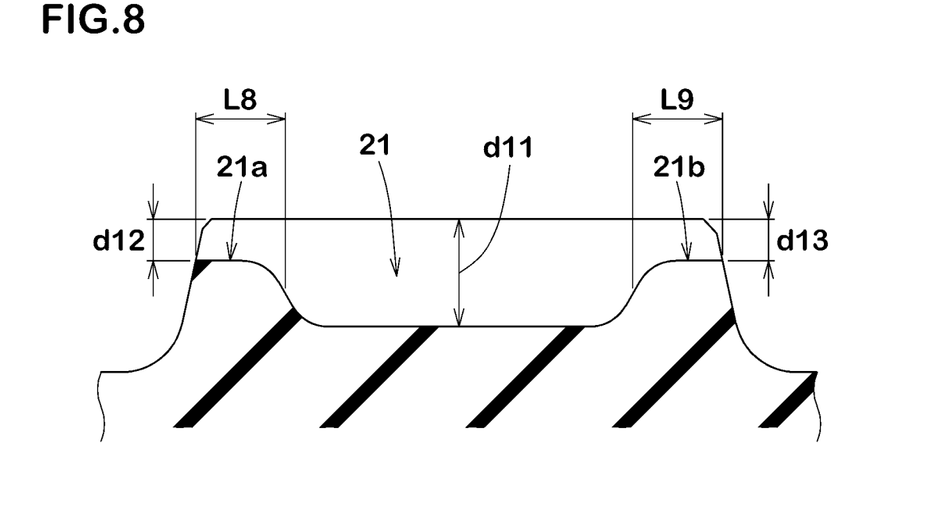
FIG. 8 is a cross-sectional view taken along line E-E of FIG. 7.

FIG. 8 is a cross-sectional view taken along line E-E of FIG. 7. As shown, the crown lateral sipe 21 has
 a first shallow portion 21a formed by a raised bottom at one end in the tire axial direction, and
 a second shallow portion 21b formed by a raised bottom at the other end in the tire axial direction.

The depth d12 of the first shallow portion 21a and the depth d13 of the second shallow portion 21b are set in a range from 30% to 45% of the maximum depth d11 of the crown lateral sipe 21, for example.

The length L8 in the tire axial direction of the first shallow portion 21a and the length L9 in the tire axial direction of the second shallow portion 21b are set in a range from 10% to 25% of the width w5 of the crown land region 9.

Such crown lateral sipes 21 including the first shallow portion 21a and the second shallow portion 21b can improve the steering stability while suppressing uneven wear of the crown land region 9.

Figure 9:
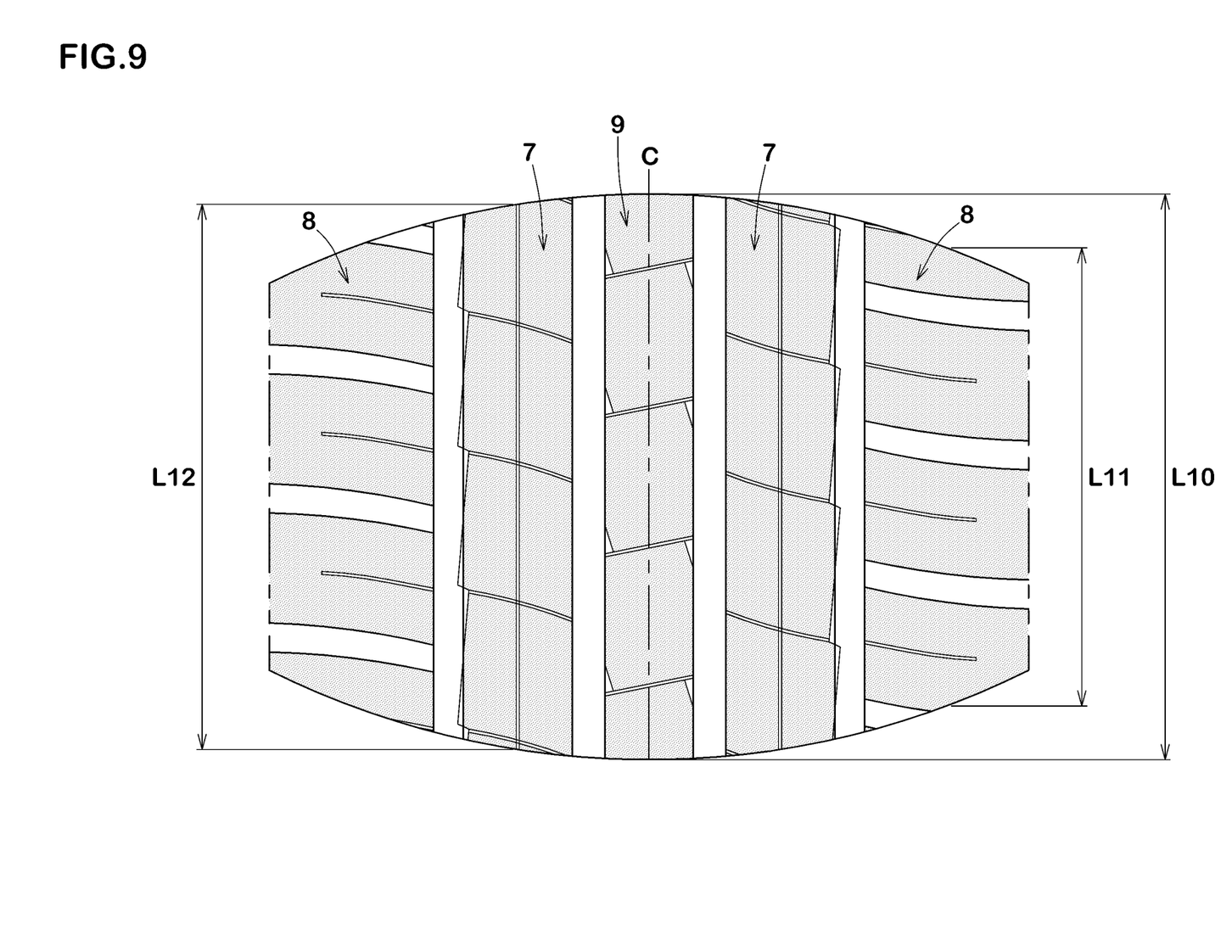
FIG. 9 is a diagram schematically showing the ground contact patch of the tire.

FIG. 9 schematically shows the ground contacting patch or footprint of the tire 1 when the tire under the standard state is put on a flat horizontal surface at a camber angle of zero and loaded with the standard tire load.

In the footprint of the tire 1, the total ground contact area s2 of the two middle land regions 7 is preferably in a range from 2.0 to 2.5 times the ground contact area s1 of the crown land region 9, and
 the total ground contact area s3 of the two shoulder land regions 8 is preferably in a range from 4.2 to 4.6 times the ground contact area s1 of the crown land region 9.

Thereby, the steering linearity is improved, the behavior when reaching near the side-slip limit is improved, and the steering stability is improved.

In order to ensure the above-mentioned effects, the length L11 in the tire circumferential direction of the ground contact surface of the shoulder land region 8 is preferably set in a range from 0.80 to 0.85 times the length L10 in the tire circumferential direction of the ground contact surface of the crown land region 9.

The length L12 in the tire circumferential direction of the ground contact surface of the middle land region 7 is preferably set in a range from 0.90 to 0.98 times the length L10 in the tire circumferential direction of the ground contact surface of the crown land region 9.

Here, the length in the tire circumferential direction of the ground contact surface of each land region is measured at a center position in the tire axial direction of each land region.

While detailed description has been made of a preferable embodiment of the present disclosure, the present disclosure can be embodied in various forms without being limited to the illustrated embodiment.

Comparison Test

Based on the tread pattern shown in FIG. 1, pneumatic tires of size 235/55R19 (rim size 19×7.0 J) were experimentally manufactured as test tires (comparative example Ref. and working examples Ex. 1-Ex. 9).

The test tires had substantially the same constructions except for the specifications shown in Table 1.

Figure 10:
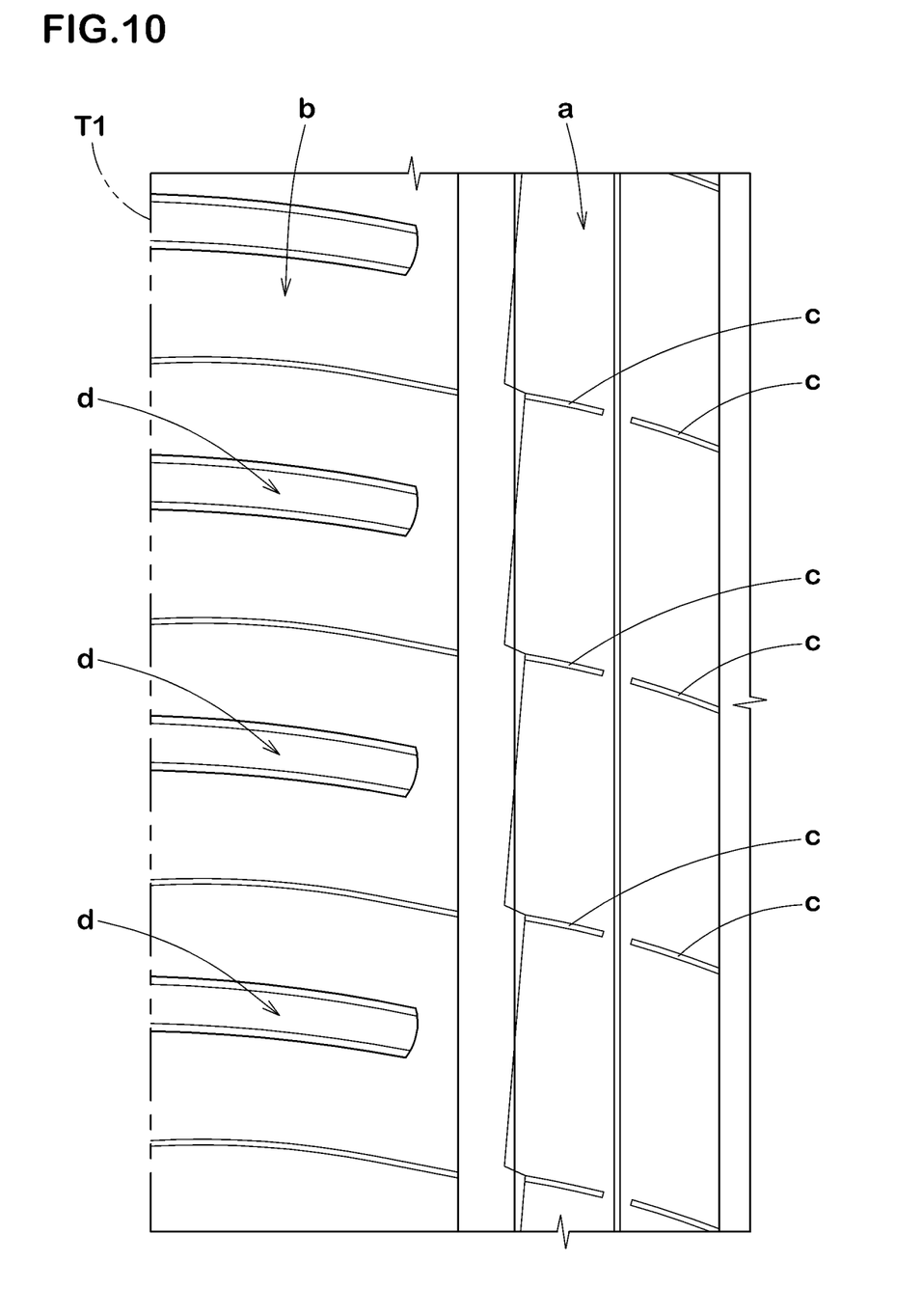
FIG. 10 shows partial top views of a middle land region and a shoulder land region of a comparative example.

The comparative example Ref had middle land regions (a) and shoulder land regions (b) as shown in FIG. 10, wherein middle lateral sipes (c) are interrupted in the middle land regions (a), and shoulder lateral grooves (d) extend from the respective tread edge and are terminated within the shoulder land regions (b).

The test tires were mounted on all wheels of a test vehicle (2000 cc 4wD car, tire pressure 230 kPa) and tested for the steering stability and noise performance as follows.

<Steering Stability Test>

While the test vehicle was running on a dry road surface, the test driver evaluated steering stability based on the initial steering response, the steering linearity, and the controllability when reaching the side-slip limit.

The test results are indicated in Table 1 by an index based on the comparative example being 100, wherein the larger the index number, the better the steering stability.

<Noise Performance Test>

The maximum noise sound pressure was measured in the interior of the test vehicle during running on a dry road surface at a speed of 40 to 100 km/h.

As the test results, reciprocals of the maximum sound pressure levels are indicated in Table 1
  by an index based on the comparative example being 100, wherein the larger the index number, the better the noise performance.

TABLE 1

|  | tire | | | | | | | | | |
| --- | --- | --- | --- | --- | --- | --- | --- | --- | --- | --- |
|  | Ref. | Ex. 1 | Ex.2 | Ex.3 | Ex.4 | Ex.5 | Ex.6 | Ex.7 | Ex.8 | Ex.9 |
| middle and shoulder land regions | FIG. 10 | FIG.2 | FIG.2 | FIG.2 | FIG.2 | FIG.2 | FIG.2 | FIG.2 | FIG.2 | FIG.2 |
| middle lateral sipe angle (deg.) | 20 | 20 | 10 | 15 | 25 | 30 | 20 | 20 | 20 | 20 |
| shoulder side sipe length L6/ shoulder land region width W3 | 68 | 68 | 68 | 68 | 68 | 68 | 55 | 60 | 75 | 80 |
| steering stability | 100 | 110 | 106 | 108 | 110 | 110 | 107 | 109 | 110 | 111 |
| noise performance | 100 | 105 | 103 | 104 | 105 | 104 | 103 | 104 | 105 | 104 |

From the test results, it was confirmed that the working example tires were improved in the steering stability and the noise performance.

STATEMENT OF THE DISCLOSURE

The present disclosure is as follows:

Disclosure 1: a tire comprising: a tread portion having a first tread edge and a second tread edge, and provided with three or four circumferential grooves continuously extending in the tire circumferential direction to axially divide the tread portion into a plurality of land regions, wherein
  the plurality of land regions include a shoulder land region including the first tread edge, and a middle land region adjacent to the shoulder land region,
  the circumferential grooves include a shoulder circumferential groove between the shoulder land region and the middle land region,
  the middle land region is provided with a middle circumferential sipe extending continuously in the tire circumferential direction, and a plurality of middle lateral sipes extending across the entire axial width of the middle land region,
  the shoulder land region is provided with a plurality of shoulder lateral grooves extending from the shoulder circumferential groove to the first tread edge, and a plurality of shoulder lateral sipes extending from the shoulder circumferential groove and terminated within the shoulder land region without reaching the first tread edge.

Disclosure 2: the tire according to the disclosure 1, wherein the groove width of each of the shoulder lateral grooves is constant from the shoulder circumferential groove to the first tread edge.

Disclosure 3: the tire according to the disclosure 1 or 2, wherein the groove bottom of each of the shoulder lateral grooves is locally raised to have a raised portion.

Disclosure 4: the tire according to the disclosure 3, wherein the raised portion of the groove bottom is provided at an axially inner end of the shoulder lateral groove.

Disclosure 5: the tire according to the disclosure 3 or 4, wherein the raised portion is provided with a groove bottom sipe extending along the longitudinal direction of the shoulder lateral groove.

Disclosure 6: the tire according to any one of the disclosures 1 to 5, wherein the maximum depth of the middle circumferential sipe is smaller than the maximum depth of the shoulder lateral sipes.

Disclosure 7: the tire according to any one of the disclosures 1 to 6, wherein the plurality of land regions include a crown land region adjacent to the middle land region, and the crown land region is provided with a plurality of crown lateral sipes extending across the entire axial width of the crown land region.

Disclosure 8: the tire according to the disclosure 7, wherein the middle lateral sipes are inclined in a first direction with respect to the tire axial direction, and the crown lateral sipes are inclined in a second direction opposite to the first direction with respect to the tire axial direction.

Disclosure 9: the tire according to the disclosure 7, wherein a length L11 in the tire circumferential direction of the ground contact surface of the shoulder land region is in a range from 0.80 to 0.85 times a length L10 in the tire circumferential direction of the ground contact surface of the crown land region.

DESCRIPTION OF THE REFERENCE SIGNS 2 tread portion
3 circumferential groove
4 land region
5 shoulder circumferential groove
7 middle land region
8 shoulder land region
11 middle circumferential sipe
12 middle lateral sipe
16 shoulder lateral groove
18 shoulder lateral sipe
T1 first tread edge

The invention claimed is:

1. A tire comprising: a tread portion having a pair of tread edges, and provided with four circumferential grooves continuously extending in the tire circumferential direction to axially divide the tread portion into five annular land regions, wherein the five annular land regions are a pair of shoulder land regions including the tread edges, respectively, a pair of middle land regions adjacent to the shoulder land regions, respectively, and a crown land region between the middle land regions, the four circumferential grooves are a pair of shoulder circumferential grooves, each disposed between the axially adjacent shoulder land region and middle land region, and a pair of crown circumferential grooves disposed between the shoulder circumferential grooves, each of the middle land regions is provided with a middle circumferential sipe extending continuously in the tire circumferential direction, and a plurality of middle lateral sipes extending across the entire axial width of the middle land region, each of the middle land regions has no groove having a width greater than 1.5 mm, the crown land region has no groove having a width greater than 1.5 mm, each of the shoulder land regions is provided with a plurality of shoulder lateral grooves extending from the adjacent shoulder circumferential groove to the adjacent tread edge, and a plurality of shoulder lateral sipes extending from the adjacent shoulder circumferential groove and terminated within the shoulder land region without reaching the adjacent tread edge, the number of the shoulder lateral sipes in each of the shoulder land regions is the same as the number of the middle lateral sipes in each of the middle land regions, and in every two of the axially adjacent middle land region and the shoulder land region, each of the middle lateral sipes and one of the shoulder lateral sipes extend within a zone whose width is not more than 8.0 mm, the crown land region is provided with a plurality of crown lateral sipes extending across the entire axial width of the crown land region, so that in the tire circumferential direction, circumferential extents of the respective crown lateral sipes do not overlap with circumferential extents of the respective middle lateral sipes, and the middle lateral sipes in the middle land regions are inclined to one side in the tire circumferential direction from one of the tread edges toward the other of the tread edges, whereas the crown lateral sipes are inclined to the other side in the tire circumferential direction from the one of the tread edges toward the other of the tread edges.

2. The tire according to claim 1, wherein the groove width of each of the shoulder lateral grooves is constant from the adjacent shoulder circumferential groove to the adjacent tread edge.

3. The tire according to claim 1, wherein the groove bottom of each of the shoulder lateral grooves is locally raised to have a raised portion.

4. The tire according to claim 3, wherein the raised portion of the groove bottom is provided at an axially inner end of the shoulder lateral groove.

5. The tire according to claim 3, wherein the raised portion is provided with a groove bottom sipe extending along the longitudinal direction of the shoulder lateral groove.

6. The tire according to claim 1, wherein a maximum depth of the middle circumferential sipe is smaller than a maximum depth of the shoulder lateral sipes.

7. The tire according to claim 1, wherein
in a foot print of the tire when the tire under a standard state is set on a flat horizontal surface at a camber angle of zero and loaded with a standard tire load, a length L11 in the tire circumferential direction of the ground contact surface of each of the shoulder land regions is in a range from 0.80 to 0.85 times a length L10 in the tire circumferential direction of the ground contact surface of the crown land region.

8. The tire according to claim 7, wherein
in the footprint of the tire, a total ground contact area of the two middle land regions is in a range from 2.0 to 2.5 times a ground contact area of the crown land region,
a total ground contact area of the two shoulder land regions is in a range from 4.2 to 4.6 times the ground contact area of the crown land region, and
a length L12 in the tire circumferential direction of the ground contact surface of each of the middle land regions is in a range from 0.90 to 0.98 times the length L10 in the tire circumferential direction of the ground contact surface of the crown land region.

9. The tire according to claim 1, wherein in each of the middle land regions, pitch lengths P1 in the tire circumferential direction of the middle lateral sipes are larger than a width in the tire axial direction of the ground contacting top surface of the middle land region.

10. The tire according to claim 9, wherein in each of the shoulder land regions, pitch lengths P2 in the tire circumferential direction of the shoulder lateral grooves are smaller than a width in the tire axial direction of the ground contacting top surface of the shoulder land region.

11. The tire according to claim 1, wherein
each of the middle lateral sipes has a maximum depth d2 less than a depth of the adjacent shoulder circumferential groove and comprises an axially outer shallow portion disposed at an axially outer end thereof, an axially inner shallow portion disposed at an axially inner end thereof, and a middle shallow portion disposed between the axially outer shallow portion and the axially inner shallow portion,
a groove depth d5 at the middle shallow portion is greater than a groove depth d3 at the axially outer shallow portion and a groove depth d4 at the axially inner shallow portion, and less than the maximum depth d2 of the middle lateral sipe,
the groove depth d5 at the middle shallow portion is more than a depth d1 of the middle circumferential sipe, and
the middle circumferential sipe is positioned at the middle shallow portion.

12. The tire according to claim 11, wherein
each of the shoulder lateral grooves is provided with a groove bottom raised portion,
a groove depth d7 at the groove bottom raised portion is 30% to 50% of a maximum depth d6 of the shoulder lateral groove,
a length L6 in the tire axial direction of the groove bottom raised portion is 5% to 15% of a width W3 in the tire axial direction of the shoulder land region,
the groove bottom raised portion is provided with a groove bottom sipe, and
a depth d8 of the groove bottom sipe from a radially outer surface of the groove bottom raised portion is 80% to 120% of the groove depth d7 at the groove bottom raised portion.

13. The tire according to claim 1, wherein
in each of the shoulder land regions, the shoulder lateral grooves and the shoulder lateral sipes are alternately arranged in the tire circumferential direction,
each of the shoulder lateral grooves is provided, at each of groove edges thereof, with a chamfer,
each of the shoulder lateral grooves is further provided with a groove bottom raised portion,
a groove depth d7 at the groove bottom raised portion is 30% to 50% of a maximum depth d6 of the shoulder lateral groove, the groove bottom raised portion is provided with a groove bottom sipe, a depth d8 of the groove bottom sipe from a radially outer surface of the groove bottom raised portion is 80% to 120% of the groove depth d7 at the groove bottom raised portion, and a length L6 in the tire axial direction of the groove bottom raised portion is 5% to 15% of a width W3 in the tire axial direction of the shoulder land region.

14. The tire according to claim 1, wherein
the bottom of each of the shoulder lateral sipes is partially raised at an axially inner end thereof so as to have a shallow portion that has a depth d10 of 35% to 50% of a maximum depth d9 of the shoulder lateral sipe.

15. The tire according to claim 1, wherein
the shoulder lateral grooves in the shoulder land regions and the shoulder lateral sipes in the shoulder land regions are inclined to said one side in the tire circumferential direction from one of the tread edges toward the other of the tread edges.

16. The tire according to claim 15, wherein
the groove bottom of each of the shoulder lateral grooves is locally raised to have a raised portion located at an axially inner end of the shoulder lateral groove.

17. The tire according to claim 16, wherein
the raised portion is provided with a groove bottom sipe extending along the longitudinal direction of the shoulder lateral groove.

18. The tire according to claim 16, wherein
each of the crown lateral sipes is provided with a first shallow portion at one end in the tire axial direction of the crown lateral sipe, and a second shallow portion at the other end in the tire axial direction of the crown lateral sipe.

* * * * *